May 29, 1928.  1,671,641
H. S. HOLMES
CONTROLLING ELECTRIC MACHINES
Filed March 21, 1925   3 Sheets-Sheet 1
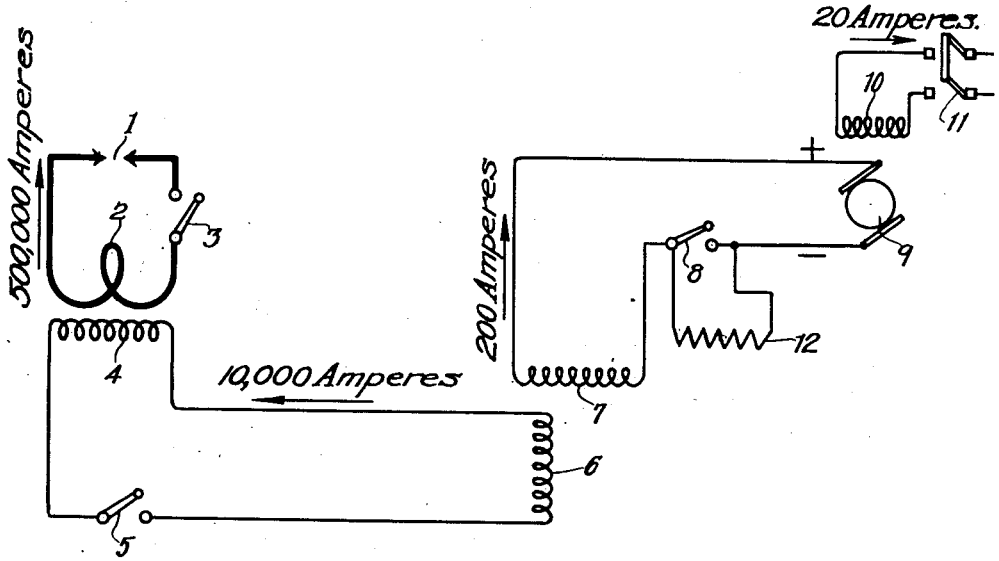
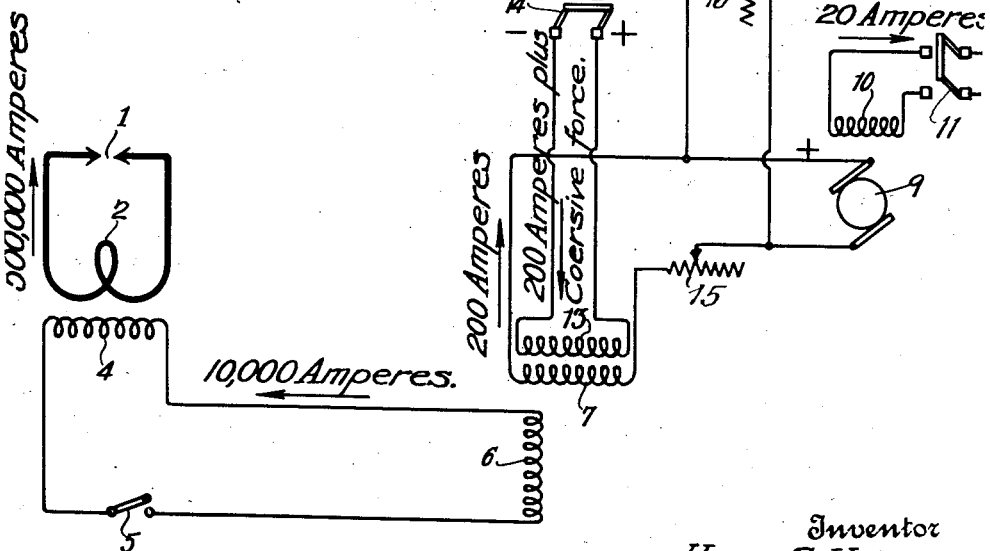
Inventor
Henry S. Holmes.
By his Attorney

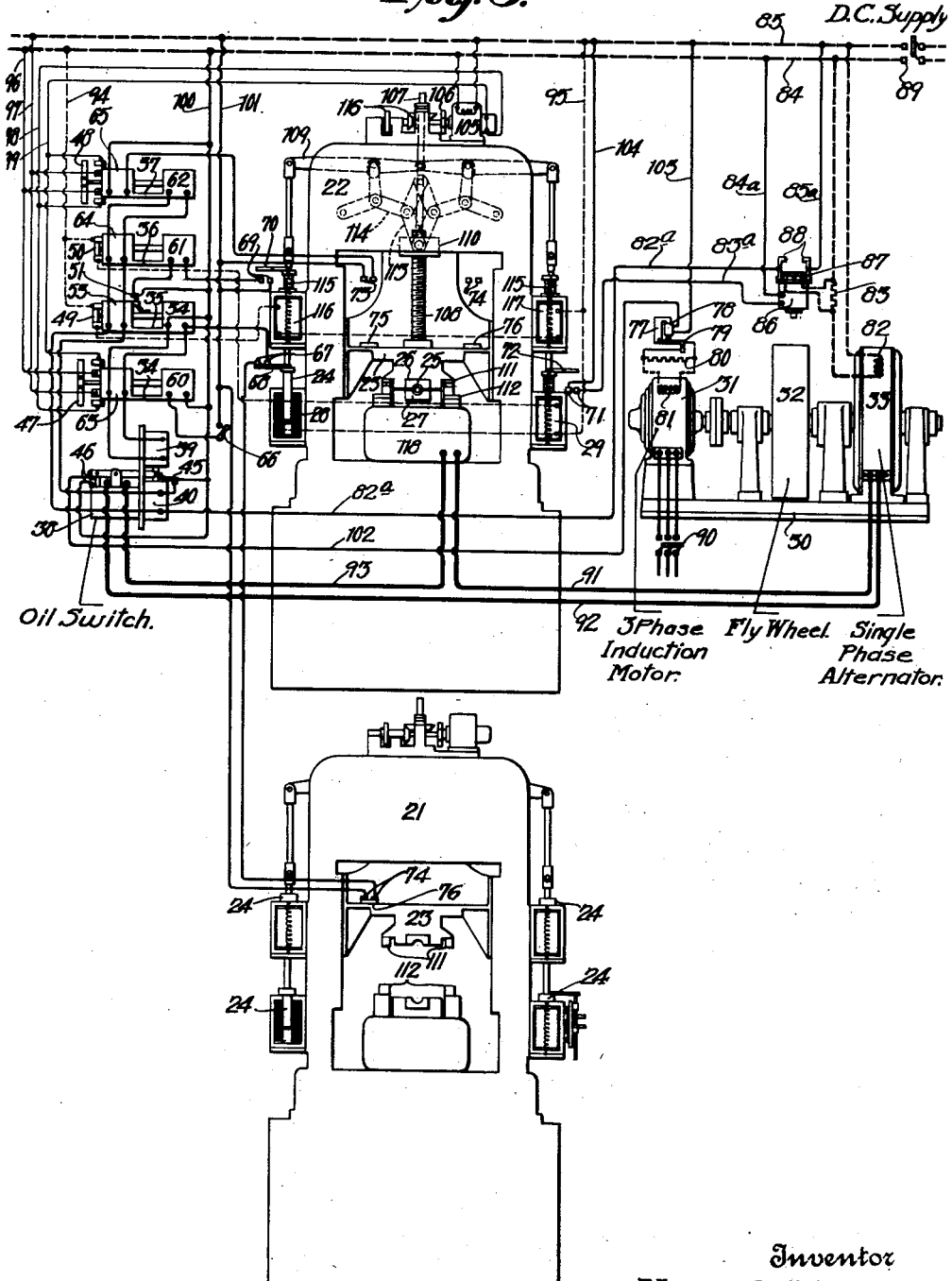

May 29, 1928.
H. S. HOLMES
1,671,641
CONTROLLING ELECTRIC MACHINES
Filed March 21, 1925
3 Sheets-Sheet 3
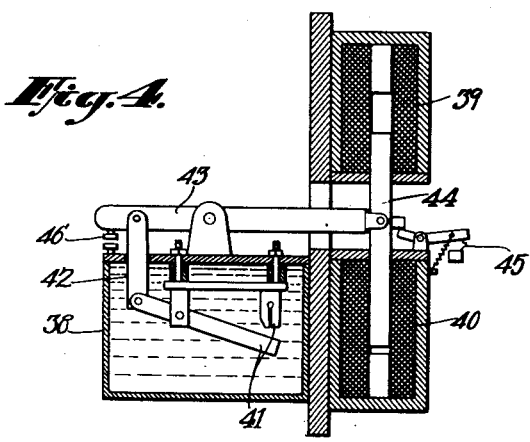
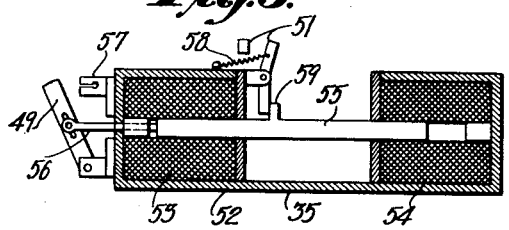
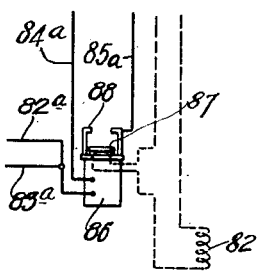
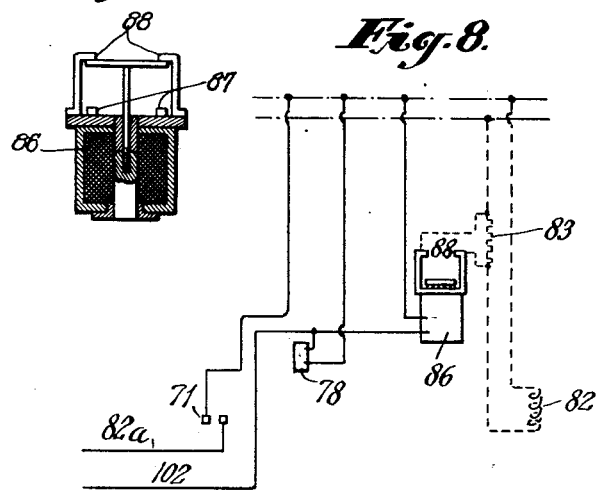
Inventor
Henry S. Holmes.
By His Attorney Patented May 29, 1928.

1,671,641

UNITED STATES PATENT OFFICE.

HENRY S. HOLMES, OF NEW YORK, N. Y., ASSIGNOR TO THOMAS E. MURRAY, OF BROOKLYN, NEW YORK.

CONTROLLING ELECTRIC MACHINES.

Application filed March 21, 1925. Serial No. 17,167.

In another pending application, No. 689,878, I have described an electric resistance welding process and apparatus using a motor generator set, the alternating current generator of which is of insufficient capacity to carry continuously the current demanded by the welding machine, and the motor of which is so designed as to draw from the electric supply system at any instant only a fraction of the current required by the welding machine. In that application I referred to various ways of controlling welding current and said: "The second method, by closing and entirely opening the field current, has the advantage that it eliminates the oil switch and the air circuit breaker and requires the smallest copper cross-section for both the armature and the field windings. But with this method there are certain incidental disadvantages, the necessity of opening the field switch slowly, and the requirement of an appreciable time for the building up of the generator voltage after the field has been excited, which characteristics make this method somewhat unsatisfactory for the Murray process, requiring a heavy current for a brief time."

In the present invention I provide three methods of eliminating the incidental disadvantages mentioned above, the first requiring no special apparatus, the other two requiring an auxiliary field winding in the generator. With all three methods I utilize a system of field control for stopping the weld. In the case of the first method I reduce the welding current to a certain predetermined value by first reducing the field current by introducing resistance into the circuit, and then I entirely break the welding current by means of a switch either in the primary or secondary of the welding transformer. With the second of these methods, I first reduce the welding current to a certain predetermined value by partly neutralizing the field flux by passing a predetermined current through the auxiliary field winding in the opposite direction to the current flowing in the main field winding, and then I entirely break the welding current by means of a switch either in the primary or secondary circuit of the welding transformer. With the third method I entirely stop the welding current by passing sufficient current through the auxiliary field winding to absolutely neutralize the field flux.

The first two methods result from the discovery that it is not necessary to entirely break the welding current in order to effectively stop the welding action, but that it is only necessary to reduce it to some lower value, which can be easily determined by experiment for any particular case. The third method is a modification of the second, and employs absolute field neutralization, thus eliminating the final breaking of the current with the switch, a feature which is particularly valuable with extra high power welding. The reason that it is possible to neutralize the field current whereas it is not feasible to entirely break the field current is because the neutralizing method acts more quickly and is less damaging to the field insulation. In the first two methods the switch which serves to make the final break in the welding current may be placed in the primary or secondary circuit of the welding transformer, and may have its contacts in air or in oil. If the switch is in the primary I prefer to use an oil switch, if in the secondary I prefer an air break switch. Both methods permit the elimination of the air breaker,—described in my application #689,878—which, in the case of certain high power welding, becomes a costly piece of apparatus which is constantly in need of repairs.

In order to more clearly understand the reasons for the necessity of controlling the welding circuit by means external to the transformer circuit I will give a brief statement of different methods of control and of the magnitudes of the currents in the different circuits of welding systems.

When electric resistance is used for welding small pieces by a slow operation with a current of relatively low magnitude, it is possible to control this welding current by opening and closing the circuit in which the electrodes are placed. For larger pieces and shorter time intervals the welding currents used have reached magnitudes of tens of thousands of amperes. This increased current has necessitated the placing of the control switch in the primary of the welding transformer where the current is only from one-fiftieth to one-hundredth of the current in the secondary of the transformer. Placed in this part of the circuit a single solenoid-operated switch has been sufficient to open and close the circuit satisfactorily when the current has not been of too great a magnitude.

However, as the welding current has risen to hundreds of thousands of amperes and the primary current to upwards of ten thousand amperes, a single contactor has not been usable to make and to break the current consistently. Sometimes the arc formed when the contactor is closed will fuse little parts of the contact plates, with the result that the plates will stick so tightly that the opening solenoid is unable to release them. This has led to the use of two contactors in the primary circuit, one for closing the circuit and one for opening the circuit, and this arrangement has finally taken the form of an oil switch for closing and an air breaker for opening. With the adoption of a motor generator designed to take from the electric power system only a fraction of the current required by the welding machine, it has become possible to utilize even greater welding currents, and the use of an air breaker in the primary circuit has become impracticable in the present state of development of such breakers. The next step was to place the control switch in the field of the generator where the current is only a fraction of that in the primary of the welding transformer. Such a location of the control switch is disclosed in a prior Heany Patent, No. 1,061,375; but the method therein described of breaking the entire field circuit is not practicable when used with rapid, high-power welding, because it is necessary to open the switch too slowly in order not to injure the field insulation and because the full effect of the opening is not felt immediately at the electrodes on account of the residual magnetism in the field.

The accompanying drawings illustrate, more or less diagrammatically, embodiments of the present invention.

Figs. 1 and 2 are diagrams of alternative arrangements for the circuits of a welding machine, fly-wheel motor generator set and exciter.

Fig. 3 is a diagram illustrating such circuits and automatic controlling devices therein applied to two welding machines operated from a single motor generator set.

Figs. 4, 5 and 6 are sectional views of controlling solenoids.

Figs. 7 and 8 are diagrams of alternative arrangements of the controls.

Referring first to Fig. 1, the electrodes of a welding machine are indicated at 1. The secondary 2 of the welding machine transformer is connected to the electrodes 1, and a switch 3 is inserted in this secondary circuit. The primary 4 of the transformer is connected through the switch 5 to the armature 6 of the alternating current generator of the fly-wheel motor generator set. The primary 4 and the armature 6 are best designed to have approximately equivalent impedances as described in my pending application No. 737,122.

The field 7 of the generator is connected through the switch 8 to the armature 9 of the exciter, and the field 10 of the exciter is connected through the switch 11 to a suitable source of direct current supply, perhaps another exciter.

When welding a certain rear axle housing, the current in the secondary circuit of the welding transformer, that is, the current flowing through the welded joint, is in the neighborhood of 500,000 amperes. The current in the primary of the welding transformer is approximately 10,000 amperes. The field current of the generator is approximately only 200 amperes, while the current in the field of the exciter is only about 20 amperes. If another exciter were used to supply the current for the field 10, then its field current would be still less, and so forth. Now, if the switches 3, 5, 8 and 11 are closed, current will flow at the electrodes. If any one of these switches is opened, current will cease to flow at the electrodes. However, it is not reasonable to expect that a 20 ampere switch in the field of an exciter will control a 2,000-kilowatt transformer which delivers 500,000 amperes, without having some drawbacks. These drawbacks are principally the time required for the effect of the opening or closing of the 20-ampere switch to be completely felt in the welding circuit, and the high voltage induced in the field windings. The high voltage can be taken care of with increased insulation at increased cost. But in order to avoid this increased cost and at the same time to overcome the slowness of operation due to the hysteresis of the magnetic circuits and the residual magnetism, I purpose to employ the principle of the methods mentioned above.

Fig. 1 illustrates the first arrangement alone, and Fig. 2 the second and third arrangements; also, they may all be combined in a single installation. According to Fig. 1 a resistance 12 is shunted around the switch 8. The value of this resistance is such that when the switch 8 is opened the field current will drop from about 200 amperes to about 60 amperes and the current in the primary of the welding transformer will be reduced to around 3,000 amperes, which amount can be readily handled on the switch 5. This feature of the invention therefore may be described as a means for reducing the amount of current which must be handled by the switch 5 without introducing such a time lag as would impair the weld. In this connection I might state that I do not know of any circuit breaker or oil switch now being manufactured which will break a current of 10,000 amperes at 300 volts 2,000 times a day and last for more than a week. It must be understood that this is an important factor in the development of welding machines. In the last ten years the maximum size of welding machines has jumped from 100 kilowatts to ver 5,000 kilowatts and with a motor generator set such as is described in my application No. 689,878 I see no limit to the future size of these machines.

According to Fig. 2, the generator of the flywheel motor generator set is equipped with a double field winding, that is each field pole has two entirely separate windings, each connected through the usual slip rings to a suitable source of direct current. The extra winding is shown at 13 connected through the switch 14 to the commutator of the exciter 9. Two variable resistances or rheostats 15, 16 are inserted in the respective field circuits. As indicated in Fig. 2, the polarities are so arranged that the current flowing through the coils 13 will be in the opposite direction to that flowing through the coils 7, and may be of any predetermined magnitude according to the adjustments of the rheostats 15, 16.

If the current flowing in coils 13 is the proper fraction of that flowing in coils 7 then the current flowing in the primary of the welding transformer will be the same as described above and shown in Fig. 1, the switch 8 being open with the resistance 12 shunted around it. Now if the current flowing through coils 13 is of the same magnitude as that flowing through coils 7, or enough greater as will supply the necessary coercive force for overcoming the residual magnetism, then there will be neutralization and no flux will be set up in the field of the generator. Therefore, no voltage will be generated in the armature 6 and no current will flow in the primary of the welding transformer, a condition similar to that which would exist in Fig. 1 if the switch 8 were open with no resistance shunted around it. I purpose to use the arrangement of Fig. 2 in the case of extra high power welding and the method of controlling the weld would then be as follows:

Assume that the pieces to be welded are in the machine, that the pressure is applied, and that the exciter and motor generator set are running. Switch 11 is closed; switches 5 and 14 are open. Then to start the weld the switch 5 is closed, and when the weld is completed the switch 14 is closed by any of the usual timing means, for instance that shown in Fig. 3. The closing of switch 14 stops the flow of current in the welding transformer, and the switch 5 can then be opened without any arc. After switch 5 has been opened, then switch 14 can be opened as slowly as desired and conditions are then ready for another weld. Thus it is seen that the weld is not only started by the closing of a switch but is also stopped by the closing of a switch and it is not necessary to break any heavy currents in the control of the weld. It is well known that it is a simple matter to close a circuit carrying a heavy load, but it is a different thing to break a heavy current, especially when the operation has to be repeated every few seconds.

In my application No. 689,878 I have described a semi-automatic method of controlling the weld. In that case the oil switch was both closed and opened by hand, while the air breaker was closed manually and opened automatically. The use of either of the control methods described above, with the consequent elimination of the air breaker, permits a practicable means of making the control of the welding machines fully automatic. That is, the operator will only have to place the pieces in the welding machine, close one switch, whereupon the head will lower, clamp the electrodes, and reset the magnets—the pressure will be applied—the welding current will be established and stopped—the head will be raised—and the operator can then remove the welded object. The operation can then be repeated.

Fig. 3 is a diagram of the connections for such an automatic control, using the first method described above. In this drawing are shown two welding machines supplied with current from a single motor generator set and adapted to be used alternately. The machines are equipped with transformers and electrodes adapted for welding rear axle housings for automobiles, and, except for the shape of these transformers and electrodes, the construction of the machines is similar to that described in application No. 689,878.

In this automatic control I have introduced several novel features, including a new method of interlock between the welding machines for allowing time for recuperation between welds; a positive method for applying the pressure on the work at the instant the welding current is started and a means for introducing resistance into the secondary of the motor during the welding period, which acts independently of the speed of the motor and which is particularly valuable for reducing voltage fluctuation in case the motor is connected to an electric system of unusually limited capacity. The last mentioned improvement has been described in my previous application No. 7,772.

In the installation of Fig. 3 an oil switch in the primary circuit of the welding machine is provided for starting the welding current. Two welding machines are shown, at 21 and 22 respectively. The moving head 23 of the first machine is shown in the upper position, which is the beginning of the welding cycle when the operator is about to put the two halves of the axle housing into the electrode. The pressure magnet plungers 24 are down when the head is in this position. The moving head 23 of machine 22 is in the lowered position, with the parts of the axle housing 25 clamped between the electrodes 26 and 27. The magnet plungers 24 are in the raised position, the upper solenoids 116 and 117 having just been energized and the welding current turned on.

The motor generator set 30 consists of a 3-phase induction motor 31 of the wound rotor type, a fly-wheel 32 and a single-phase alternator 33.

Four contactors are shown in connection with machine 22, each of the solenoid-opening and solenoid-closing type, designated as a whole by the numerals 34, 35, 36 and 37. The oil switch 38 for the welding current is closed by a solenoid 39 and opened by a solenoid 40.

A cross-section of this oil switch is shown separately in Fig. 4. The alternating current is carried by the switch terminals 41, the movable member being actuated through a link 42 and lever 43 connected at its opposite arm to the rod 44 which is pulled in opposite directions by the respective solenoids. This oil switch 38 carries also pairs of auxiliary contacts 45 and 46 which are likewise closed and opened with the main switch.

As shown in Fig. 3, the contactors 34 and 37 operate double-pole switches 47 and 48 respectively. The contactors 35 and 36 operate single-pole switches 49 and 50 respectively.

Contactor 35 is shown separately in Fig. 5. It carries also an auxiliary pair of contacts 51 which are closed when the switch 49 is closed and open when the latter is open. As shown in Fig. 5, the iron frame 52 carries two solenoids, 53 and 54, in which works a movable plunger 55 connected by a rod 56 to the switch blade 49, which is pivoted at its lower end to the frame and which engages the clips 57 to close the circuit when the solenoid 54 is energized and which is disengaged from the clips 57 to break the circuit when the solenoid 53 is energized. The contacts 51 are brought together by the spring 58 when the switch 49 is closed, and are separated by means of the boss 59 on the plunger when the switch 49 is opened.

In Fig. 3 the closing coils of the four contactors are numbered 60, 54, 61 and 62. The opening coils are numbered 63, 53, 64 and 65 respectively. The switch 66 is the only switch which the operator touches. It can be placed conveniently on the front of the welding machine and may be of the push-button type, closed by the operator's finger and spring-opened.

Mounted at a suitable point on the frame of the machine are a pair of contacts 67 adapted to be engaged by a bar 68 mounted on the magnet plunger when the plunger is in its upper position. There are also contacts 69 adjustable up and down and engaged and connected by a bar 70 when the magnet plungers are in a certain intermediate position, that is, when the weld is in progress and the take-up of the work is partly accomplished.

At the opposite side of the machine there are contacts 71 adapted to be connected by a bar 72 mounted on the solenoid plunger at that side when the plunger is approximately in the lower position. Limit pairs of contacts 73 and 74 are adapted to be connected when the moving head is in the upper position by means of straps 75 and 76 mounted on the head in line with the respective pairs of contacts. The contacts 74 and strap 76 are repeated as shown on machine 21.

Controlling the rotor of the motor 31 there is a contactor 77 comprising a solenoid 78 which actuates a contact arm 79 to short circuit a resistance 80 which is in series with the rotor or secondary winding 81 of the motor. For simplicity only one phase of the winding is shown. In reality there are three windings brought out through the usual slip rings to three resistances.

The field 82 of the generator 33 is connected through a resistance 83 to the direct-current bus 84, the opposite end of the field being connected to the other direct-current bus 85. A contactor 86 closes the contacts 87 (see Fig. 6) when not energized, and closes the contacts 88 when energized.

The direct-current supply comes in through a switch 89 to the various controlling devices, and the alternating-current supply through a switch 90 to the motor 81. The wires carrying the alternating current for the welding machine transformer are shown by the heavy solid lines 91, 92 and 93. Those carrying the pressure magnet current are shown in light, broken lines 94 (connected to the D. C. bus 84) and 95 connected to the bus 85. The wires of the circuit of the motor for lifting and lowering the pressure head are shown in the light solid lines 96, 97, 98 and 99. The control wires for the several contactors are shown in solid lines of intermediate thickness; 100 and 101 leading from the direct-current buses to the solenoids of the contactors at the left of the machine and to the contact points on the machine; the wires 84$^a$ and 83$^a$ leading to the solenoid 86; the wires 82$^a$ and 85$^a$ leading to the contacts 88; the wire 102 leading to the solenoid 78; the wire 103 leading from this solenoid to the bus and the wire 104 leading from one of the contact points 71 to the bus.

The method is as follows:

Assume that the switches 89 and 90 are closed and that the motor generator set is running. Assume also for the machine 22 that the head 23 is in the upper position and the magnet plungers 24 in the downward position. A segment of the housing to be welded is placed in the bottom electrode 27 and the opposite segment is placed on top of it.

The switch 66 is then pressed to close it, which excites the solenoid 60, which closes its switch 47. The operator then removes his finger from the switch 66 and this switch opens. The closing of the switch 47 starts the motor 105 which, by means of the gears 106 and the shaft 107, rotates the screw in such a direction that the head 23 will move downward. The weight of the magnet armatures 24 and the levers 109 connected thereto is sufficient to hold the nut 110 stationary in the downward position, so that the effect of rotating the screw 108 is to move the cross-head 23 downwardly, thus clamping the two housing halves to be welded between the electrodes 26 and 27 and closing the secondary welding circuit through the contacts 111 and 112. The parts of the work are held together with a moderate pressure depending upon the weight of the magnet armatures 24 and the connected parts.

The continued rotation of the shaft, the downward movement of the cross-head 23 and screw 108 being stopped by the resistance of the work, will cause the nut 110 to ascend for a short distance on the screw 108. The effect of this motion multiplied by the toggles 113 and 114 and the levers 109 and aided by the springs 115 is to raise mechanically the plunger armatures 24.

The plunger 24 at the left of the machine carries the strap 68 up to a point where it bridges the contacts 67. By reason of this closure, and provided the contacts 74 on machine 21 are closed by the straps 76, the solenoids 54, 63, and 39 will be energized, thus closing the switches 45, 46, 49, 51 and 38, and opening the switch 47. (It will be noted that because the switch 51 was previously opened, the solenoid 61 was not energized when the strap 70 passed over the contacts 69 during the upward movement of the plunger 24.) The opening of switch 47 stops the motor 105. The closing of switch 49 energizes the pressure solenoids 116 and 117 at opposite sides of the machine, which are connected in series. The reason of the series connection of these two pressure magnets and the parallel connection of the lower pair of magnets 28 and 29 is described in a previous application of Holmes and Hoffer, No. 736,808.

The closing of the oil switch 38 allows current to flow through the main contacts thereof to the welding machine transformer 118 and at the same instant allows direct current to flow through the auxiliary contacts 46, thus energizing the solenoid 78 which opens the contact 79, thus cutting the resistance 80 in series with the secondary 81 of the motor 31. It will be noted that at the time the alternating current was established in the welding transformer the contacts 87 on the contactor 86 were connected to each other, thus short circuiting the resistance 83 and allowing full curernt to flow through the field 82 of the generator 33.

Current now flows through the edges of the two halves of the housing 25, and the halves are forcibly pressed together as the magnet plungers 24 are drawn down into the solenoids. When the plungers reach a predetermined point on their downward movement, the strap 70 at the upper end of the left hand plunger bridges the contacts 69 and causes the energizing of the solenoid 61, thus closing the switch 50. This closure energizes the lower pressure magnets 28 and 29 which are connected in parallel and the result is that a much heavier presure is applied to the work. The advantage of this varying pressure is explained in my Patent No. 1,523,593.

When the magnet plungers 24 reach a further predetermined point on their downward movement, the strap 72 at the right of the machine, which is secured to and moves with the plunger on that side, closes the contacts 71, which energizes the contactor 86, thus opening the contacts 87 and thereby introducing the resistance 83 into the field circuit of the generator 33. This resistance 83 reduces the field current to a predetermined value and correspondingly reduces the welding current to such a value that the welding action ceases, also the current in the primary circuit of the transformer is reduced to a value which can be easily handled by the oil switch. Approximately simultaneously with the opening of the contacts 87, depending on the time lag of the contactor 86, comes the closing of the upper contacts thereon, 88. This closure energizes the solenoidds 40, 53, 64, and 62, thus opening the switches 38, 45, 46, 49, 51 and 50 and closing the switch 48.

The opening of the switch 38 renders the welding transformer completely inactive. The opening of the switch 45 de-energizes the solenoids 40, 53, 64 and 62 after their respective armature plungers have reached the ends of their strokes. The opening of the switch 46 de-energizes the solenoid 78 allowing the contact 79 to close, thus short circuiting resistance 80. The opening of the switches 49 and 50 disconnects all the pressure magnets from their supply. The opening of the switch 51 prevents the energizing of solenoid 61 at the wrong time, as mentioned above. And the closing of the switch 48 sends the current in the opposite direction through the armature of the motor 105, which results in the raising by said motor of the cross-head 23 until the strap 75 on the cross-head connects the contacts 73. Thereupon the solenoid 65 will be energized, thus opening the switch 48 and stopping the motor. The solenoid 62 has previously been disconnected by the switch 45, which prevents it from bucking the action of the solenoid 65. This completes the cycle and the operator removes the welded product.

The speed of the motor 105, the ratio of the gearing 106 and the number of threads per inch on the screw 108 are such that a predetermined time occurs during the raising movement of the cross-head 23. This time is made approximately the same as that required by the motor generator for recuperation. Therefore, by means of the interlocking contacts 74 on each of the welding machines, it is impossible to weld on one machine until a predetermined time has occurred after the finish of the weld on the other machine.

This time lag is useful even with installations where the electric supply is sufficient for a more rapid succession of operations. There are cases in which the machines overheat under too rapid a succession of operations and require a certain rest or recuperation to be in condition for another welding operation. The time lag arrangement takes care of this and all other cases in which a certain period of time is required for recuperation or restoration to normal.

The connections for machine 21 would be the same as those shown on machine 22 and they would be interlocked with machine 22 through the contacts 74 on the latter. If more than two welders are used, then it is preferable to apply the interlocking mechanism described in my application No. 745,265. In that case each switch 66 would be of the same general construction as the oil switch described in that application; the construction, however, being much lighter and the contacts being in air instead of in oil. For the sake of clearness I have not shown the connections for machine 21. These will be apparent to a person skilled in the art. The contactor 77 can be common to both machines. All the other contactors must be duplicated.

If the magnitude of the current which still flows in the welding circuit after the resistance 83 has been introduced into the field circuit of the generator is not too great, the oil switch can be eliminated, the switch 66 blades 111 and 112 mounted on the opposite heads of the machine and in the secondary circuit of the transformer performing the functions of the oil switch.

Two other connections which are advantageous in certain cases should be described: First, that covering the case where it is desired to entirely open and close the field circuit simultaneously with the opening and closing of the oil switch; and second, that covering the case where it is desired to close the oil switch slightly in advance of the short circuiting of the resistance 83.

Figure 7 shows the first arrangement. The resistance 83 has been removed and the wire $82^a$ has been disconnected from the contact 88 and connected to the wire $83^a$. With this arrangement, when the strap 72 at the right of the machine closes the contacts 71 to stop the weld, it will open the contacts 87 on the contactor 86 and at the same instant open the oil switch 38. This means that the field 82 of the generator 33 will be opened at the same instant that the main circuit of the welding machine is opened. Thus I am stopping the weld by the simultaneous opening of two separate circuits, in which case each switch breaks a fraction of the load.

The second case referred to above is illustrated in Figure 8. In this case solenoids 78 and 86 are in parallel and are energized through the contact 46 when the oil switch 38 is closed. Due to a time lag in the contactor 86, the contacts 88 are not closed until slightly after the oil switch 38 is closed and therefore there is a corresponding delay in the short circuiting of the resistance 83. Thus the weld is started with reduced current which eases the shock to the generator.

Though I have described with great particularity of detail certain embodiments of my invention, it is not to be understood therefrom that the invention is restricted to the particular embodiments disclosed. Various modifications thereof in detail and in the arrangement of the parts may be made by those skilled in the art without departure from the invention as defined in the following claims.

What I claim is:

1. An electric resistance welding apparatus adapted to utilize heavy currents from the secondary winding of a transformer for a short period of time in combination with such a transformer and an alternating current generator connected to the primary winding of said transformer, and means for controlling the welding current by reducing the current in the field of the generator sufficiently to stop the welding action and means for breaking said primary circuit.

2. An electric welding control apparatus comprising a plurality of welding machines, requiring a period of time for recuperation between welds, and means dependent on the travel of a moving part of one welding machine for preventing operation of the other welding machine during said time of recuperation.

3. Electric welding control apparatus comprising welding electrodes, a welding transformer, an alternating current generator, means internal to the transformer circuit for causing the energizing of said transformer and means for neutralizing the field of said generator whereby the transformer becomes de-energized.

4. Electric welding control apparatus comprising electrical means for effecting the means for simultaneously establishing a current in the circuit of said means and in the circuit of the welding pressure and welding current.

5. An electric welding apparatus including a transformer and an alternating current generator in the primary circuit of the transformer comprising an armature and field, the windings of said field consisting of two separate circuits, one for carrying the current which establishes the magnetic flux, and one for neutralizing said flux.

6. In electric welding by the secondary current from a transformer whose primary current is supplied by a generator, the method of control which consists of starting the welding by closing the primary circuit of the welding transformer and stopping the weld by neutralizing the field of the supply generator.

7. In electric welding with a welding machine supplied with current by an alternating generator, the method of controlling the machine which consists of energizing said machine by closing a switch in the armature circuit of the supply generator and de-energizing said machine by neutralizing the field of said generator.

8. In electric welding by current from an alternating generator the method of stopping the weld which consists of the simultaneous opening of the field and armature circuit of said generator.

In witness whereof, I have hereunto signed my name.

HENRY S. HOLMES.

CERTIFICATE OF CORRECTION.

Patent No. 1,671,641.  Granted May 29, 1928, to

HENRY S. HOLMES.

It is hereby certified that error appears in the printed specification of the above numbered patent requiring correction as follows: Page 7, line 19, claim 4, strike out the words "welding pressure and", and insert the same to follow after the article "the" in line 16, same claim; and that the said Letters Patent should be read with this correction therein that the same may conform to the record of the case in the Patent Office.

Signed and sealed this 26th day of June, A. D. 1928.

M. J. Moore,
Acting Commissioner of Patents.